June 22, 1965     H. EBERT     3,190,075

INFINITELY VARIABLE TRANSMISSION

Original Filed May 8, 1961     2 Sheets-Sheet 1

INVENTOR.
HEINRICH EBERT

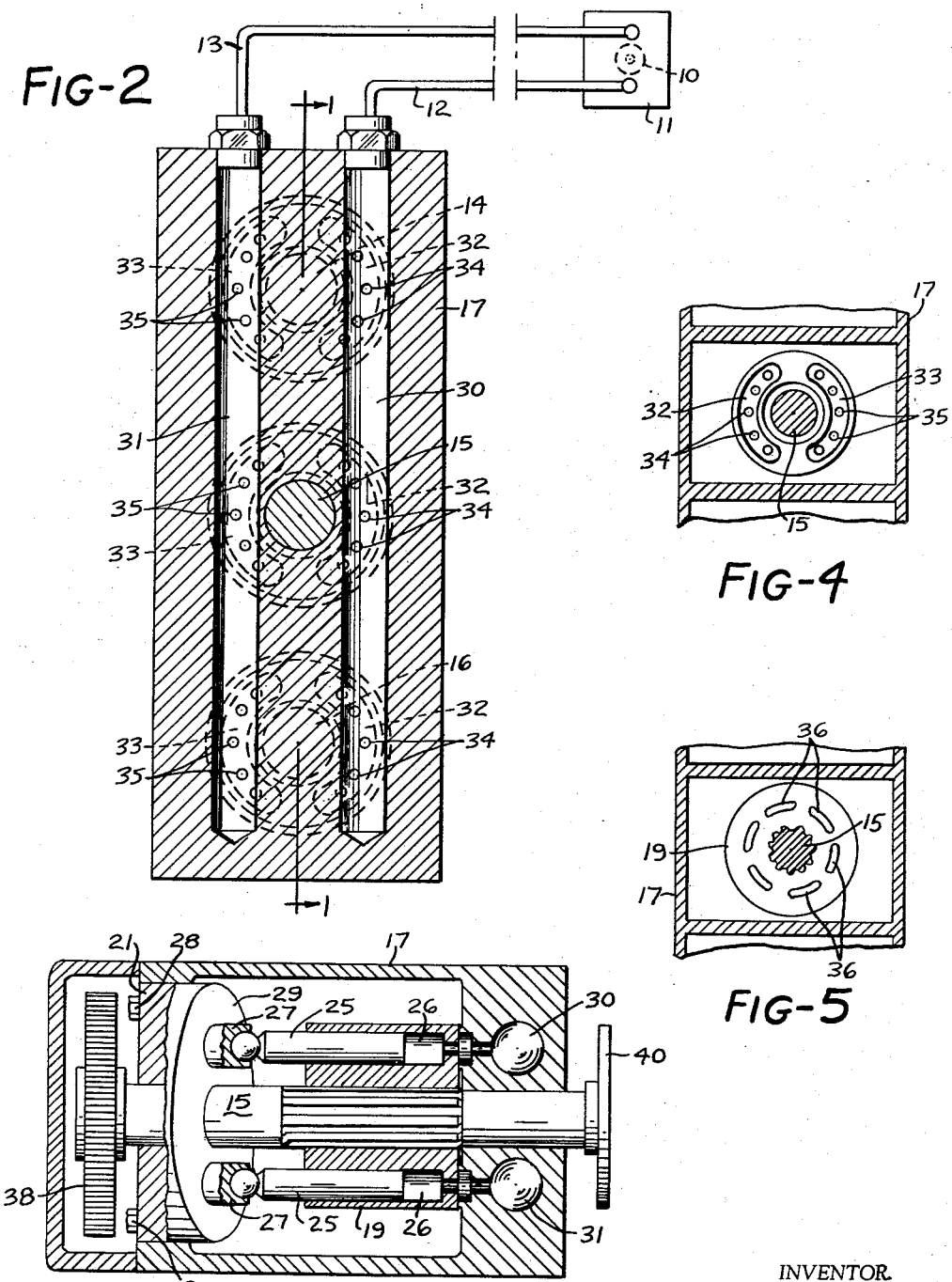

United States Patent Office 3,190,075
Patented June 22, 1965

3,190,075
INFINITELY VARIABLE TRANSMISSION
Heinrich Ebert, Im Weller 2, Furth, Bavaria, Germany
Original application May 8, 1961, Ser. No. 108,349, now Patent No. 3,123,975, dated Mar. 10, 1964. Divided and this application Dec. 13, 1963, Ser. No. 330,353
Claims priority, application Germany, Aug. 14, 1957, E 14,537
8 Claims. (Cl. 60—53)

The present application is a division of my co-pending application Serial No. 108,349, filed May 8, 1961, now Patent No. 3,123,975, issued March 10, 1964, which, in turn, is a continuation-in-part application of my co-pending application Serial No. 748,708 filed July 15, 1958, now abandoned.

The present invention relates to a variable hydraulic transmission of the axial piston type with rotary cylinder blocks and tilted swash plates.

The present invention, although not limited to, is particularly advantageous for use in connection with transmissions for passenger cars having high speed engines. For motor vehicles of this type, transmissions are required which at maximum engine speed of approximately 5000 r.p.m. have a maximum stepdown ratio of approximately from 1:3.2 to 1:3.8. In view of the rather limited space available for the installation of such transmissions, and in view of the necessary high speed, it is important that the hydraulic unit and, above all, also the hydraulic motors are of relatively small size because the permissible maximum sliding speed at the interengaging control valve sealing surfaces is limited. Furthermore, the centrifugal forces of the pistons and the centrifugal moments caused thereby should be as small as possible.

It is an object of the present invention to provide an infinitely variable hydraulic axial piston transmission which will yield a particularly compact and relatively small structure.

It is another object of this invention to provide a hydraulic axial piston transmission which will make it possible to eliminate complicated transmission elements heretofore necessary between pump and motor units and between motor and output shaft.

These and other objects and advantages of the invention will appear more clearly from the following specification in connection with the accompanying drawings, in which:

FIGURE 2 is a transverse sectional view taken on line 2—2 of FIGURE 1;

FIGURE 3 is a plan sectional view taken on line 3—3 of FIGURE 2, and

Figure 1:
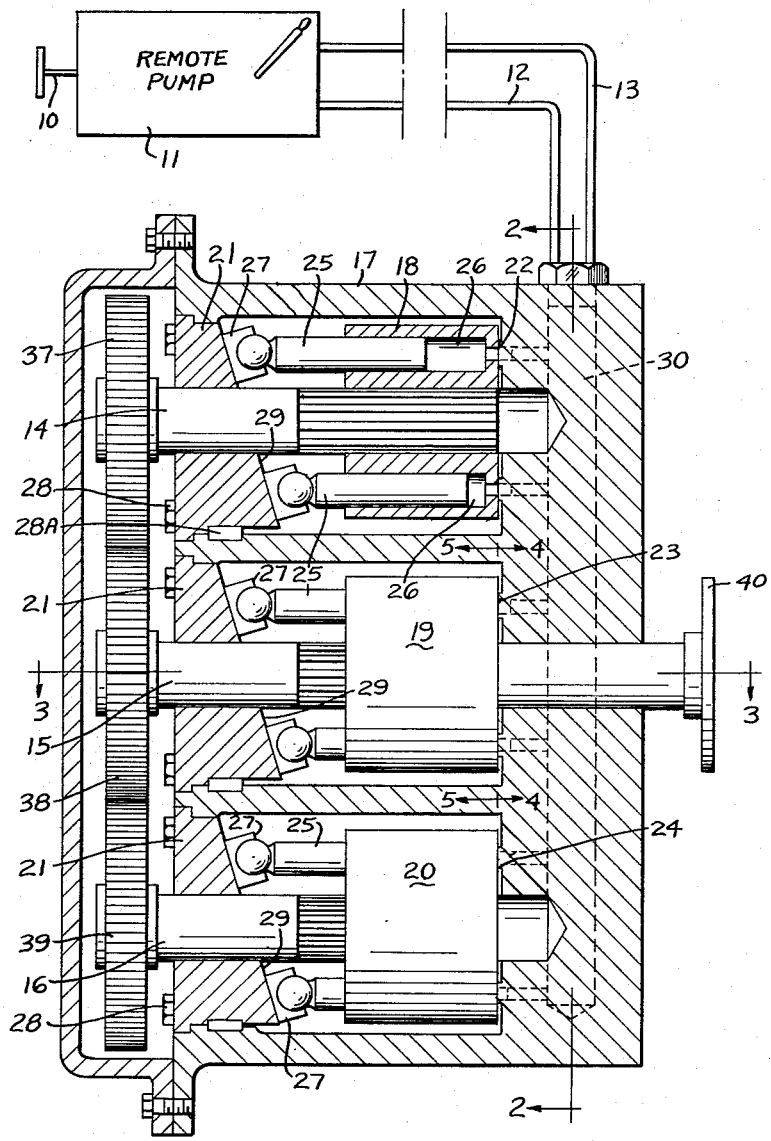
FIGURE 1 illustrates a longitudinal section through the motor unit of a transmission according to the present invention with three units of the axial piston type arranged on a common fluid conveying member.

FIGURES 4 and 5 are sectional views taken on lines 4—4 and 5—5 respectively of FIGURE 1.

*General arrangement*

The problem underlying the present invention has been realized in connection with an infinitely variable hydraulic piston transmission comprising at least a plurality of motor units of the axial piston type. Each unit comprises a shaft rotatably journalled in a transmission housing, cylinder block means drivingly connected to said shaft, swash plate means, control valve means, and a plurality of pistons axially reciprocable in cylinders of said cylinder block means and acting upon the swash plate means. The swash plate means are tilted relative to the axis of the shaft of the respective unit. The said control valves are fixedly connected to a fluid conveying member common to all of said control valves and communicating with the pressure conduits and suction conduits therein. The fluid conveying member is fixedly connected to or is a part of the transmission housing.

By sub-dividing the motor component to provide a plurality of axial cylinder blocks, a considerable reduction in the cylinder block diameter is obtained. Moreover, by conveying the fluid through the control valves in axial direction from one common fluid conveying member, no tilting space is needed either for the cylinder blocks or for the conveyance of the fluid between the different units. The arrangement according to the invention, namely, to use such cylinder blocks the axes of which are parallel with regard to each other while the control valves of the units are arranged on one common stationary fluid conveying member with pressure and suction conduits between the said control valves therein, makes possible a favorable construction, i.e. a cylinder block arrangement in which the individual motor units will be of smaller dimensions while at the same time the conveyance of oil in the units will be greatly simplified in a manner not obtainable heretofore.

The working fluid is conveyed by stationary elements only and is controlled by control valves inside of the projection of the cylinder blocks onto a plane perpendicular to the axes of the cylinder blocks only. In this way, the arrangement and the dimensions of the conduits will be particularly simple.

The arrangement of the present invention, according to FIGURES 1 to 5 comprises an input shaft 10 connected in any convenient manner to a reversible variable delivery pump 11 of any suitable type with pressure and suction conduits 12 and 13 leading to the motor component of the transmission.

The motor component of the transmission, seen in FIGURES 1 and 2 consists, in conformity with the invention, of three individual motor units of the axial piston type, each comprising a shaft 14, 15, 16 rotatably journalled in the transmission housing 17, a cylinder block 18, 19, 20 splined thereto, a fixed swash plate or supporting member 21, control valve means 22, 23, 24 and a plurality of pistons 25 axially reciprocable in cylinders 26 of the cylinder blocks 18, 19, 20 and acting by means of shoes 27 directly upon said swash plate or supporting member of the respective unit, said shoes being linked by a spherical joint to the respective pistons. The shafts of all three motor cylinder blocks are arranged parallel to each other in one plane. The swash plate or supporting member of each unit is fixed to the housing 17 by screws 28 and keys 28a so as not to be rotatable and is provided with an inclined surface 29 on the side toward the respective pistons and cylinder block so that the pistons, during the rotation of the respective cylinder block, will reciprocate.

The respective control valve means are associated with a common fluid conveying member which is in the form of conduits 30 and 31 formed directly in housing 17. The conduits 30 and 31 which are connected to conduits 12 and 13 are arranged on one and the same side only of the transmission housing 17. The surfaces of the control valve means engaged by the ends of the cylinder blocks are located in a plane perpendicular to the shaft axes of the individual units. The control valve means for each cylinder block has two kidney-shaped cavities 32 and 33 as shown in FIGURE 4. One cavity of each control valve communicates via holes 34 with the stationary conduit 30 whereas the other cavity of each control valve communicates via holes 35 with the stationary conduit 31, both conduits being straight. Both cavities control the oil flow in axial direction to and from the cylinder of the respective cylinder blocks through ports 36 in the cylinder ends pertaining to each cylinder in the respective cylinder block (FIGURE 5). The shafts 14 and 16 of the two outer motor units are drivingly connected to the shaft 15 of the center unit by means of gears 37, 38, 39 keyed to the shafts. The shaft 15 of the central motor unit forms the output shaft and is provided with flanged end 40 for connection to a driven member.

The present invention will yield transmissions or transmission components which, due to the small diameter of their cylinder blocks in combination with their simple space saving fluid confining member, will have surprisingly small cross sectional areas for the installation, as is required for the employment of such transmissions in motor vehicles, especially passenger cars if such hydrostatic transmissions, due to their particular advantages, are to be used instead of the heretofore known change transmissions.

It is, of course, to be understood, that the present invention is, by no means, limited to the particular constructions shown in the drawings but also comprises any modifications within the scope of the appended claims.

What is claimed is:

1. In a hydrostatic transmission with swash plate operated pistons, a housing member having pressure fluid and suction fluid conduit means therein, a plurality of hydraulic units of the axial piston type in said housing, arranged therein on one and the same side of said conduit means, each one of said units having a swash plate and also having a rotatable cylinder block provided with a plurality of cyinders extending substantially in the direction of the axes of rotation of said cylinder blocks, the axes of rotation of said cylinder blocks being substantially parallel to each other, a plurality of pistons respectively reciprocable in the cylinders of each of said cylinder blocks and acting upon the respective swash plate, each of said swash plates being stationarily mounted in said housing, control valve means for each cylinder block comprising passage means in said housing extending in axial direction of said cylinders leading from said cylinder blocks to said conduit means and operable in response to the rotation of said cylinder blocks for alternately establishing communication between said cylinders and said pressure fluid conduit means and between said cylinders and said suction fluid conduit means, said passage means being located entirely within the radial limits of said cylinder blocks.

2. In a hydrostatic transmission with swash plate operated pistons, a housing member having pressure fluid and suction fluid conduit means therein, a plurality of hydraulic units of the axial piston type in said housing, arranged therein on one and the same side of said conduit means, each one of said units having a swash plate and also having a rotatable cylinder block provided with a plurality of cylinders extending substantially in the direction of the axes of rotation of said cylinder blocks, the axes of rotation of said cylinder blocks being substantially parallel to each other, a plurality of pistons respectively reciprocable in the cylinders of each of said cylinder blocks and acting upon the respective swash plate, each of said swash plates being stationarily mounted in said housing, control valve means for each cylinder block comprising passage means in said housing extending in axial direction of said cylinders leading from said cylinder blocks to said conduit means and operable in response to the rotation of said cylinder blocks for alternately establishing communication between said cylinders and said pressure fluid conduit means and between said cylinders and said suction fluid conduit means, said passage means being located entirely within the radial limits of said cylinder blocks, a shaft supporting each cylinder block and journaled in said housing, meshing gears on said shafts, and one of said shafts extending out of said housing for connection to a load to be driven.

3. In a hydrostatic transmission with swash plate operated pistons, a housing member having pressure fluid and suction fluid conduit means therein, a plurality of hydraulic units of the axial piston type in said housing, arranged therein on one and the same side of said conduit means, each one of said units having a swash plate and also having a rotatable cylinder block provided with a plurality of cylinders extending substantially in the direction of the axes of rotation of said cylinder blocks, the axes of rotation of said cylinder blocks being substantially parallel to each other, a plurality of pistons respectively reciprocable in the cylinders of each of said cylinder blocks and acting upon the respective swash plate, each of said swash plates being stationarily mounted in said housing, control valve means for each cylinder block comprising passage means in said housing extending in axial direction of said cylinders leading from said cylinder blocks to said conduit means and operable in response to the rotation of said cylinder blocks for alternately establishing communication between said cylinders and said pressure fluid conduit means and between said cylinders and said suction fluid conduit means, said passage means being located entirely within the radial limits of said cylinder blocks, a shaft supporting each cylinder block and journaled in said housing, meshing gears all of the same size fixed to said shafts, and one of said shafts extending out of said housing for connection to a load to be driven.

4. In a hydrostatic transmission with swash plate operated pistons, a housing member having pressure fluid and suction fluid conduit means therein, a plurality of hydraulic units of the axial piston type in said housing, arranged therein on one and the same side of said conduit means, each one of said units having a swash plate and also having a rotatable cylinder block provided with a plurality of cylinders extending substantially in the direction of the axes of rotation of said cylinder blocks, the axes of rotation of said cylinder blocks being substantially parallel to each other, a plurality of pistons respectively reciprocable in the cylinders of each of said cylinder blocks and acting upon the respective swash plate, each of said swash plates being stationarily mounted in said housing, control valve means for each cylinder block comprising passage means in said housing extending in axial direction of said cylinders leading from said cylinder blocks to said conduit means and operable in response to the rotation of said cylinder blocks for alternately establishing communication between said cylinders and said pressure fluid conduit means and between said cylinders and said suction fluid conduit means, said passage means being located entirely within the radial limits of said cylinder blocks, a shaft supporting each cylinder block and journaled in said housing, meshing gears on said shafts, and one of said shafts extending out of said housing for connection to a load to be driven, a variable delivery pump, and conduits connecting opposite sides of said pump with said conduit means.

5. In a hydrostatic transmission with swash plate operated pistons, a housing member having pressure fluid and suction fluid conduit means therein, a plurality of hydraulic units of the axial piston type in said housing, arranged therein on one and the same side of said conduit means, each one of said units having a swash plate and also having a rotatable cylinder block provided with a plurality of cylinders extending substantially in the direction of the axes of rotation of said cylinder blocks, the axes of rotation of said cylinder blocks being substantially parallel to each other, a plurality of pistons respectively reciprocable in the cylinders of each of said cylinder blocks and acting upon the respective swash plate, each of said swash plates being stationarily mounted in said housing, control valve means for each cylinder block comprising passage means in said housing extending in axial direction of said cylinders leading from said cylinder blocks to said conduit means and operable in response to the rotation of said cylinder blocks for alternately establishing communication between said cylinders and said pressure fluid conduit means and between said cylinders and said suction fluid conduit means, said passage means being located entirely within the radial limits of said cylinder blocks, a shaft supporting each cylinder block and journaled in said housing, meshing gears on said shafts, and one of said shafts extending out of said housing for connection to a load to be driven, a variable delivery pump, and conduits connecting opposite sides of said pump with said conduit means, said conduit means being straight and said cylinder blocks having their axes arranged in a single plane.

6. In a hydrostatic transmission with swash plate operated pistons, a housing member having pressure fluid and suction fluid conduit means therein, a plurality of hydraulic units of the axial piston type in said housing, arranged therein on one and the same side of said conduit means, each one of said units having a swash plate and also having a rotatable cylinder block provided with a plurality of cylinders extending substantially in the direction of the axes of rotation of said cylinder blocks, the axes of rotation of said cylinder blocks being substantially parallel to each other, a plurality of pistons respectively reciprocable in the cylinders of each of said cylinder blocks and acting upon the respective swash plate, each of said swash plates being stationarily mounted in said housing, control valve means for each cylinder block comprising passage means in said housing extending in axial direction of said cylinders leading from said cylinder blocks to said conduit means and operable in response to the rotation of said cylinder blocks for alternately establishing communication between said cylinders and said pressure fluid conduit means and between said cylinders and said suction fluid conduit means, said passage means being located entirely within the radial limits of said cylinder blocks, a shaft supporting each cylinder block and journaled in said housing, meshing gears on said shafts, and one of said shafts extending out of said housing for connection to a load to be driven, said housing having cylindrical bores in which said cylinder blocks are disposed, a chamber in said housing at one end of said bores, said swash plates being fixedly mounted in the said one end of said bores, and said gears being located in said chamber.

7. In a hydrostatic transmission with swash plate operated pistons, a housing member having pressure fluid and suction fluid conduit means therein, a plurality of hydraulic units of the axial piston type in said housing, arranged therein on one and the same side of said conduit means, each one of said units having a swash plate and also having a rotatable cylinder block provided with a plurality of cylinders extending substantially in the direction of the axes of rotation of said cylinder blocks, the axes of rotation of said cylinder blocks being substantially parallel to each other, a plurality of pistons respectively reciprocable in the cylinders of each of said cylinder blocks and acting upon the respective swash plate, each of said swash plates being stationarily mounted in said housing, control valve means for each cylinder block comprising passage means in said housing extending in axial direction of said cylinders leading from said cylinder blocks to said conduit means and operable in response to the rotation of said cylinder blocks for alternately establishing communication between said cylinders and said pressure fluid conduit means and between said cylinders and said suction fluid conduit means, said passage means being located entirely within the radial limits of said cylinder blocks, a shaft supporting each cylinder block and journaled in said housing, meshing gears on said shafts, and one of said shafts extending out of said housing for connection to a load to be driven, said housing having kidney shaped recesses at the ends of said cylinder blocks, said passage means leading from said recesses to said conduit means.

8. In a hydrostatic transmission with swash plate operated pistons, a housing member having pressure fluid and suction fluid conduit means therein, a plurality of hydraulic units of the axial piston type in said housing, arranged therein on one and the same side of said conduit means, each one of said units having a swash plate and also having a rotatable cylinder block provided with a plurality of cylinders extending substantially in the direction of the axes of rotation of said cylinder blocks, the axes of rotation of said cylinder blocks being substantially parallel to each other, a plurality of pistons respectively reciprocable in the cylinders of each of said cylinder blocks and acting upon the respective swash plate, each of said swash plates being stationarily mounted in said housing, control valve means for each cylinder block comprising passage means in said housing extending in axial direction of said cylinders leading from said cylinder blocks to said conduit means and operable in response to the rotation of said cylinder blocks for alternately establishing communication between said cylinders and said pressure fluid conduit means and between said cylinders and said suction fluid conduit means, said passage means being located entirely within the radial limits of said cylinder blocks, a shaft supporting each cylinder block and journaled in said housing, meshing gears on said shafts, and one of said shafts extending out of said housing for connection to a load to be driven, said housing having cylindrical bores in which said cylinder blocks are disposed, a chamber in said housing at one end of said bores, said swash plates being fixedly mounted in the said one ends of said bores, and said gears being located in said chamber, said bores having flat bottoms at their other ends on which said cylinder blocks bottom, kidney shaped recesses in said flat bottoms, said passage means leading from said recesses to said conduit means.

No references cited.

JULIUS E. WEST, *Primary Examiner.*